UNITED STATES PATENT OFFICE.

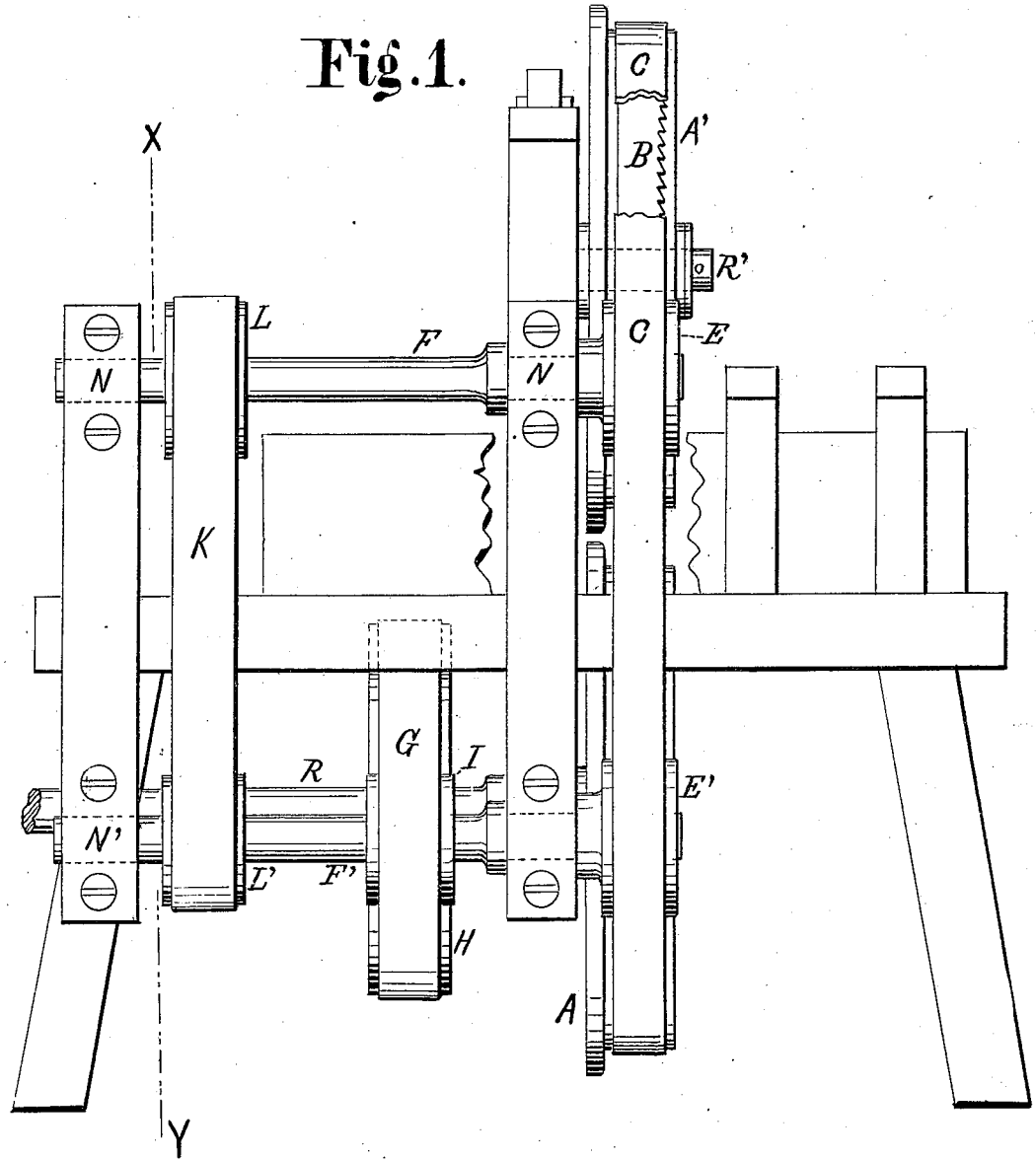

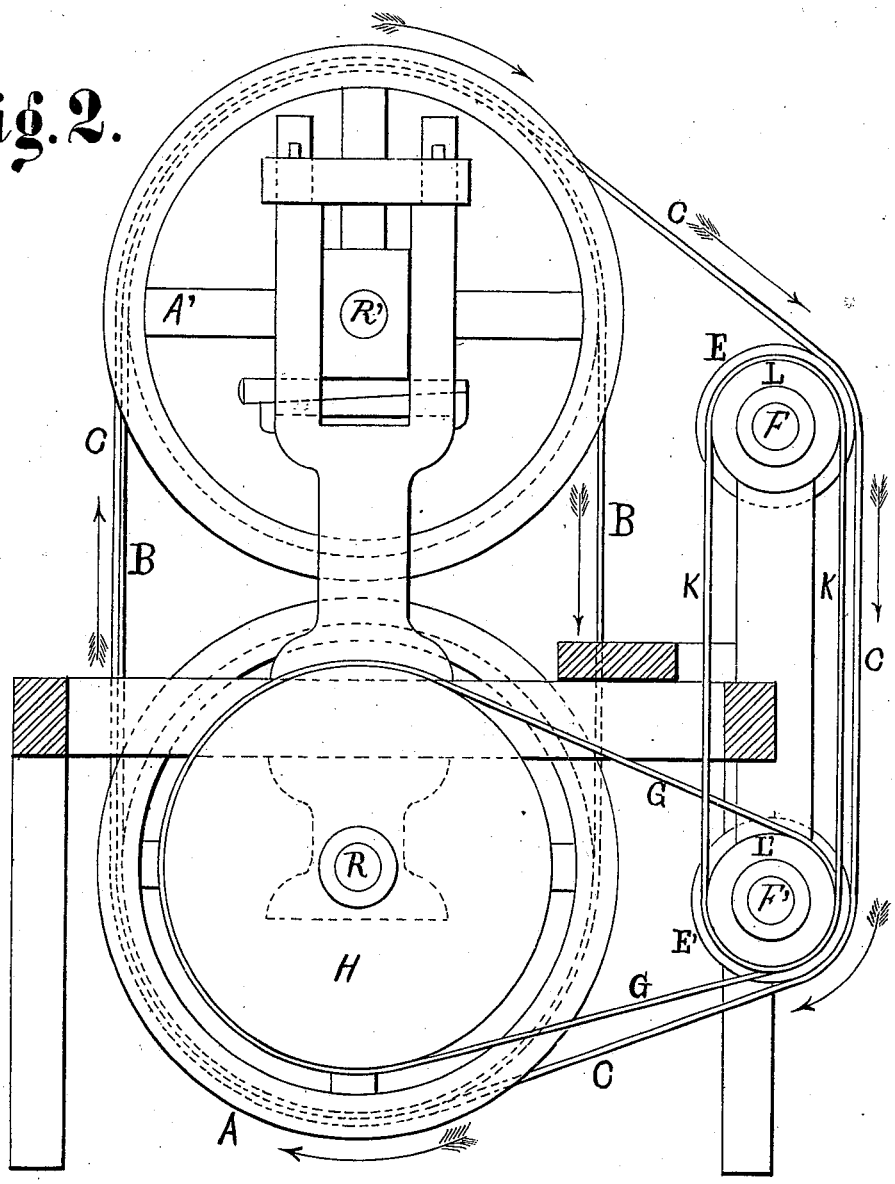

GEORGE F. WOOD, OF PHILADELPHIA, PENNSYLVANIA.

IMPROVEMENT IN BAND-SAWS.

Specification forming part of Letters Patent No. 167,721, dated September 14, 1875; application filed May 3, 1875.

*To all whom it may concern:*

Be it known that I, GEORGE F. WOOD, of Philadelphia, in the county of Philadelphia and State of Pennsylvania, have invented a new and useful Improvement in Band-Saws, which improvement is fully set forth in the following specification, reference being had to the accompanying drawings.

The object of my invention is to relieve the saw-blade from the tensile strain induced by the tension required for propelling the blade by its friction upon the lower saw-pulley, and by pulling the saw through the kerf, or by driving the upper pulley by the saw.

Generally band-saws are propelled by the lower pulley, and as the lower half of the circumference of that pulley is often barely sufficient to overcome the friction of and drive the upper pulley by the saw, the latter has to be strained to very near the breaking-limit in order to perform any work, and, being constantly bending and unbending, while running under such great strain frequent breakage is the result.

I accomplish the object of my invention by a system of counter or carrier pulleys, E E', and counter-shafts F F', by which I am enabled to propel the saw-blade by contact with two frictional surfaces, one upon each side of the saw-blade, both surfaces moving with an equal linear velocity, holding the saw-blade between them, and imparting to it their own motion. These carrier-pulleys permit the belt C, which forms the outer frictional surface, to remain in contact with the saw-blade nearly throughout its entire length or circuit, and they further serve to carry the belt C around the outside of the material to be sawed where the saw passes through the kerf.

Figure 1 is a front view of the machine, and Fig. 2 a vertical section through the line *x y*, Fig. 1, showing the essential parts.

The arrows in Fig. 2 indicate the direction of the motion.

The power is applied to the shaft R, to the end of which the saw-pulley A is fastened, as in the common machine, and the upper pulley A' runs loosely upon the stud R', which is adjustable in a vertical direction, as usual. The endless saw-blade B is placed upon the pulleys A and A' in the usual manner, and over the outside of the saw-blade B a belt, C, of leather, rubber, or other suitable material, is placed, to which motion is imparted equal in velocity to that of the peripheries of the pulleys A and A'. This motion is derived from the main driving-shaft R by means of the counter-pulleys E and E', fastened, respectively, to counter-shafts F F', which latter run in bearings N N', Fig. 1, and are driven by the belt G, which passes over the pulley H on the main driving-shaft R and over the pulley I, Fig. 1, upon the counter-shaft F'. The counter-shaft F is driven by the belt K passing over the pulleys L and L'.

Instead of driving the counter-shaft F from F' it may be driven direct from the shaft R in the same manner as the counter-shaft F'.

The diameters of all the pulleys, by which the motion is transmitted from the shaft R to the saw B, must be so proportioned that they will cause the belt C and the periphery of the pulley A to move with equal velocities.

What I claim as my invention, and desire to secure by Letters Patent, is—

The arrangement of the carrier-pulleys E and E', counter-shafts F and F', pulleys L, L', I, and H, and belts K and G, in combination with the belt C, saw-blade B, and pulleys A and A', substantially as and for the purpose specified.

GEORGE F. WOOD.

Witnesses:
CHAS. E. PANCOAST,
H. N. FARR.